United States Patent
Wiercienski et al.

(10) Patent No.: US 7,969,512 B2
(45) Date of Patent: Jun. 28, 2011

(54) MEMORY BANDWIDTH AMORTIZATION

(75) Inventors: Paul Wiercienski, Toronto (CA); Chris Wiesner, Uxbridge (CA); Oswin Hall, Unionville (CA)

(73) Assignee: ATI Technologies, Inc., Markham, Ontario (CA)

( * ) Notice: Subject to any disclaimer, the term of this patent is extended or adjusted under 35 U.S.C. 154(b) by 1285 days.

(21) Appl. No.: 11/467,755

(22) Filed: Aug. 28, 2006

(65) Prior Publication Data

US 2008/0066134 A1 Mar. 13, 2008

(51) Int. Cl.
*H04N 9/64* (2006.01)
(52) U.S. Cl. .......................... 348/718; 345/541; 710/60
(58) Field of Classification Search .......... 348/714–719; 345/530–574; 710/240, 58–61
See application file for complete search history.

(56) References Cited

U.S. PATENT DOCUMENTS

| | | | |
|---|---|---|---|
| 5,938,734 A * | 8/1999 | Yao et al. ...................... | 709/232 |
| 6,282,589 B1 * | 8/2001 | Porterfield et al. ............. | 710/52 |
| 7,080,177 B2 * | 7/2006 | Neuman ....................... | 710/240 |
| 7,081,896 B1 * | 7/2006 | Rao et al. ..................... | 345/534 |
| 2002/0131496 A1* | 9/2002 | Vasudevan et al. ...... | 375/240.11 |

* cited by examiner

*Primary Examiner* — M. Lee
(74) *Attorney, Agent, or Firm* — Volpe and Koenig, P.C.

(57) ABSTRACT

A system for processing video information, the system including a memory configured to store video information, a memory controller coupled to the memory and configured to receive memory requests for the video information, a first video signal processing client coupled to the memory controller. The first video signal processing client including a video signal processor, a buffer coupled to the video signal processor, and a memory request module coupled to the memory controller and to the buffer, the memory request module being configured to submit amortized memory requests to the memory controller.

21 Claims, 9 Drawing Sheets

3.75 Vertical Downscaling Ratio

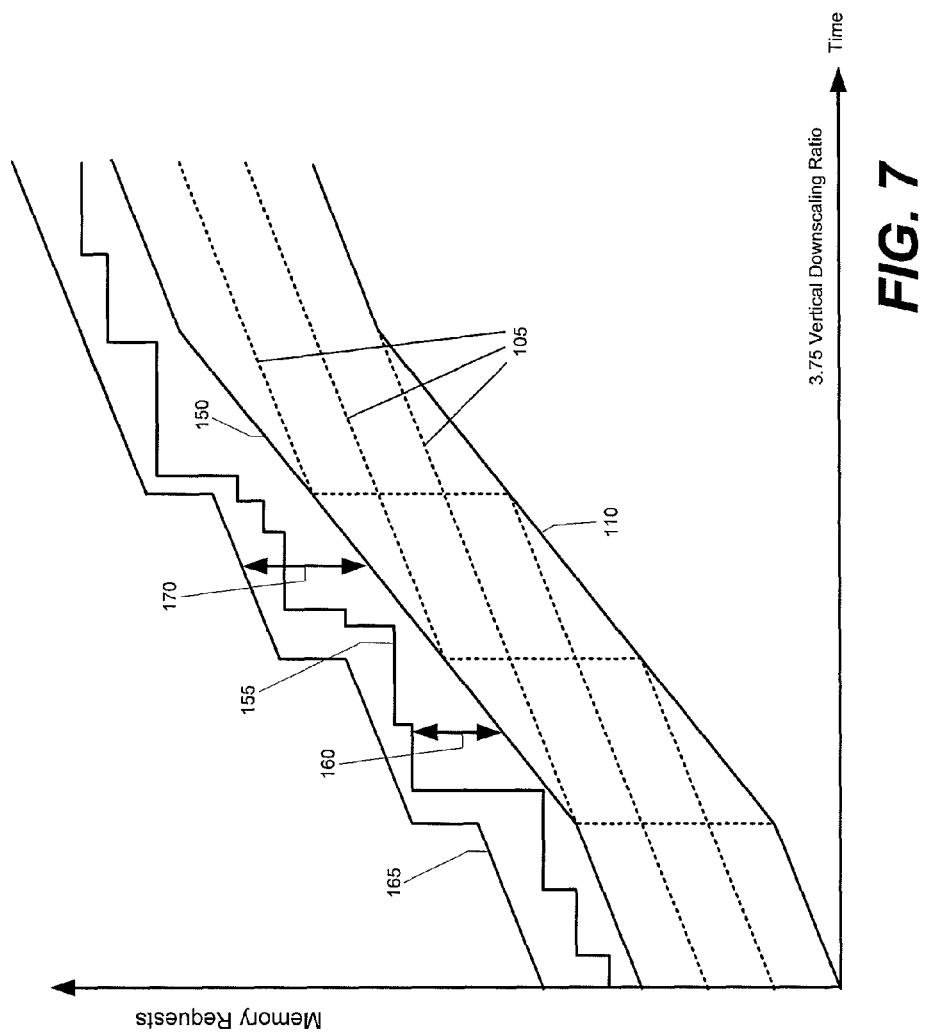

MEMORY BANDWIDTH AMORTIZATION

BACKGROUND

Today, many forms of information are processed for display on a display such as a television. An example of such information is digital television (DTV) information. Processing of DTV information typically involves the use of a memory (e.g., RAM) to store information used during the process of displaying the information on a display and a memory controller. Certain aspects of DTV processing can have characteristics that can be very taxing on the memory controller, which can ultimately lead to higher equipment costs and/or lower performance. For example, one type of processing that DTV information typically undergoes involves scaling an image from one resolution to another. For example, to display an incoming high-definition television (HDTV) signal having a resolution of 1280×720 pixels on a standard definition television set, the video signal should be downscaled to 704×480 pixels.

The amount of information requested from the memory via the memory controller can vary over time depending on the processing operation being performed. For example, vertical downscaling of an image can cause large bandwidth fluctuations from horizontal line to horizontal line, which can lead to exceeding the bandwidth limitations of the memory and the memory controller. Typically, the variable-rate requests to the memory and the memory controller are dealt with by throttling the requests made to the memory and the memory controller. Throttling the memory requests, however, can lead to overall higher system costs because the memory and the memory controller should be able to support the highest average peak bandwidth.

SUMMARY

A system for processing video information, the system including a memory configured to store video information, a memory controller coupled to the memory and configured to receive memory requests for the video information, a first video signal processing client coupled to the memory controller. The first video signal processing client includes a video signal processor, a buffer coupled to the video signal processor, and a memory request module coupled to the memory controller and to the buffer, the memory request module being configured to submit amortized memory requests to the memory controller.

Implementations of the invention can include one or more of the following features. The memory request module is configured to, for each respective one of the amortized memory requests, calculate a first deadline indicative of a time by which the first video signal processing client desires information requested in each respective one of the amortized memory requests. The memory request module is configured to calculate the first deadline as a function of the amount of information stored in the buffer and a rate at which the video signal processor consumes the information stored in the buffer. The memory controller is configured to fulfill a selected one of the amortized memory requests as a function of the first deadline included with the selected memory request.

Implementations of the invention can further include one or more of the following features. The invention further includes a second video signal processing client configured to submit memory requests to the memory controller, each respective memory request submitted by the second client including a second deadline indicative of a time by which the second client desires information requested in the respective memory request. The memory controller is configured to fulfill memory requests from the first video signal processing client and the second client as a function of the first and second deadlines included in the respective memory requests. The buffer further includes a first-in-first-out (FIFO) buffer. The memory request module is configured to calculate the first deadline based on an amount of video information stored in the FIFO. The memory controller is configured to build up credit with the video signal processing client by fulfilling outstanding memory requests from the first video signal processing client prior to the respective first deadline included in each of the respective memory requests. The memory request module is configured to calculate an average rate at which the video signal processor desires video information from the memory, and to scale the average rate by a scaling factor to generate a virtual read pointer. The scaling factor is substantially equal to a quantity of input lines used by the video signal processor to generate an output line. The video signal processor is a scaler. The amortized memory requests are submitted to the memory controller at a rate based on a scaling ratio at which the scaler is operating.

In general, in another aspect, the invention provides a method of managing memory requests from a video signal processing client to a memory and a memory controller, the method includes calculating an average rate at which the video signal processing client desires video information from the memory, scaling the average rate by a scaling factor to generate a virtual read pointer, submitting the memory requests from the video signal processing client to the memory controller at an amortized rate based on the virtual read pointer.

Implementations of the invention can include one or more of the following features. The method further includes generating a deadline, for each respective memory request, indicative of a time by which the video signal processing client desires information requested in the respective memory request, and including the generated deadline in each submitted memory request. The deadline is based upon the amount of video information stored in the video signal processing client and the rate at which the video signal processing client consumes the video information. The method further includes fulfilling the submitted memory requests based upon the deadline included in each respective memory request. The method further includes building up credit with the video signal processing client by fulfilling selected memory requests prior to the deadlines included in the selected memory requests. The method further includes calculating an estimated time of starvation based upon the virtual read pointer. Submitting the memory requests includes submitting the memory requests at a rate based on the estimated time of starvation. The method further includes receiving memory requests at the memory controller from another client, wherein each of the memory requests from the another client includes another deadline indicative of a respective time by which the another client desires information requested in each of the memory requests. Fulfilling the memory requests includes fulfilling the memory requests from the video signal processing client and the another client based upon the respective another deadline included in each respective memory request.

Various aspects of the invention may provide one or more of the following capabilities. Bandwidth pressure can be presented to a memory controller at an amortized rate. Bandwidth fluctuations can be minimized compared with prior techniques. The aggregate size of memory latency units used within the system can be reduced. Throttling of memory requests can be avoided. The memory controller can be configured to fulfill memory requests during lulls in system bandwidth usage. Implementation costs can be reduced compared to prior techniques. Multiple downscaling ratios can be supported. Anamorphic scaling and pillar boxing can be implemented.

These and other capabilities of the invention, along with the invention itself, will be more fully understood after a review of the following figures, detailed description, and claims.

BRIEF DESCRIPTION OF THE FIGURES

FIG. 7 is a graph indicating memory consumption and replenishment rates of the system shown in FIG. 2.

DETAILED DESCRIPTION

Embodiments of the invention provide techniques for generating and responding to memory requests from multiple signal processors, and in particular for controlling memory requests from a variable rate video scaler. For example, a DTV receiver includes a memory, a memory controller, and a client. The client can generate memory requests that are not constant over time causing the memory controller to become overwhelmed at some times, and underutilized at other times. The client is configured to generate memory requests, at e.g., the maximum possible rate (i.e., whenever there is space in the circular buffer), that each include a deadline indicating a time by which the requested information is desired from the memory. This deadline can represent the amortized rate at which the client desires data. For example, while memory requests can be submitted to the memory controller at a constant rate, the deadline by which the requested information is desired by the client can be amortized. The memory controller is configured to use the deadline information provided in the memory requests from the client to prioritize and fulfill multiple memory requests from multiple clients. The memory controller can be configured to build up "credit" with an individual client by fulfilling memory requests ahead of the deadline. The memory controller can be configured such that it can choose to fulfill a request that is not necessarily the most urgent request, e.g., but that is a more efficient request to fulfill.

Figure 1:
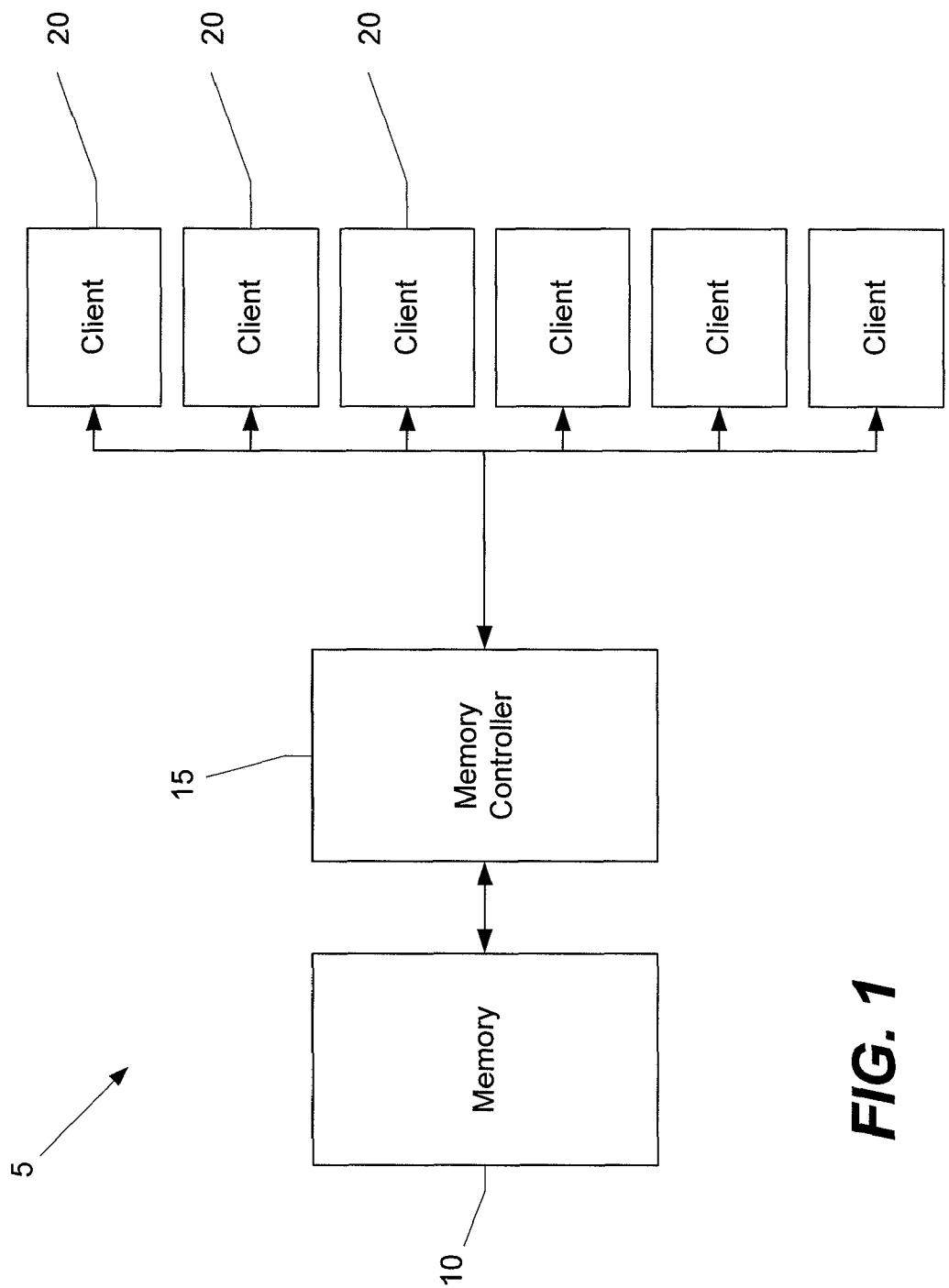
FIG. 1 is a block diagram of a signal processing system including multiple clients.

Referring to FIG. 1, a system 5 includes a memory 10, a memory controller 15, and clients 20. The memory 10 is RAM such as DDR-II RAM, although other types of memory can be used. The memory controller 15 is a processor configured to, e.g., receive memory requests from clients and to control the operation of the memory 10. The clients 20 are signal processing devices such as scalers, deinterlacers, resamplers, etc.

The memory controller 15 is configured to generate signals used to control the reading of information from and writing of information to the memory 10, and is configured to interface the memory 10 with the clients 20. The memory controller 15 is configured to receive information via the clients 20 provided by a video source and store it in the memory 10. For example, the memory controller 10 can store a high-definition television (HDTV) signal received from a cable television provider in the memory 10. Each of the clients 20 is configured to provide memory requests to the memory controller 15 requesting the information stored in the memory 10. Each of the memory requests from each of the clients 20 includes a time stamp indicating a time by which the client 20 desires the requested information. If the requested information is not received by the desired time, the integrity of the resulting video image can be compromised (e.g., the image can be distorted). The memory controller 15 is configured to receive the memory requests from the clients 20 and to determine the speed and/or order in which memory requests from the each of the clients 20 are fulfilled. While the system 5 has been described as processing video information, other types of information can be processed.

Figure 2:
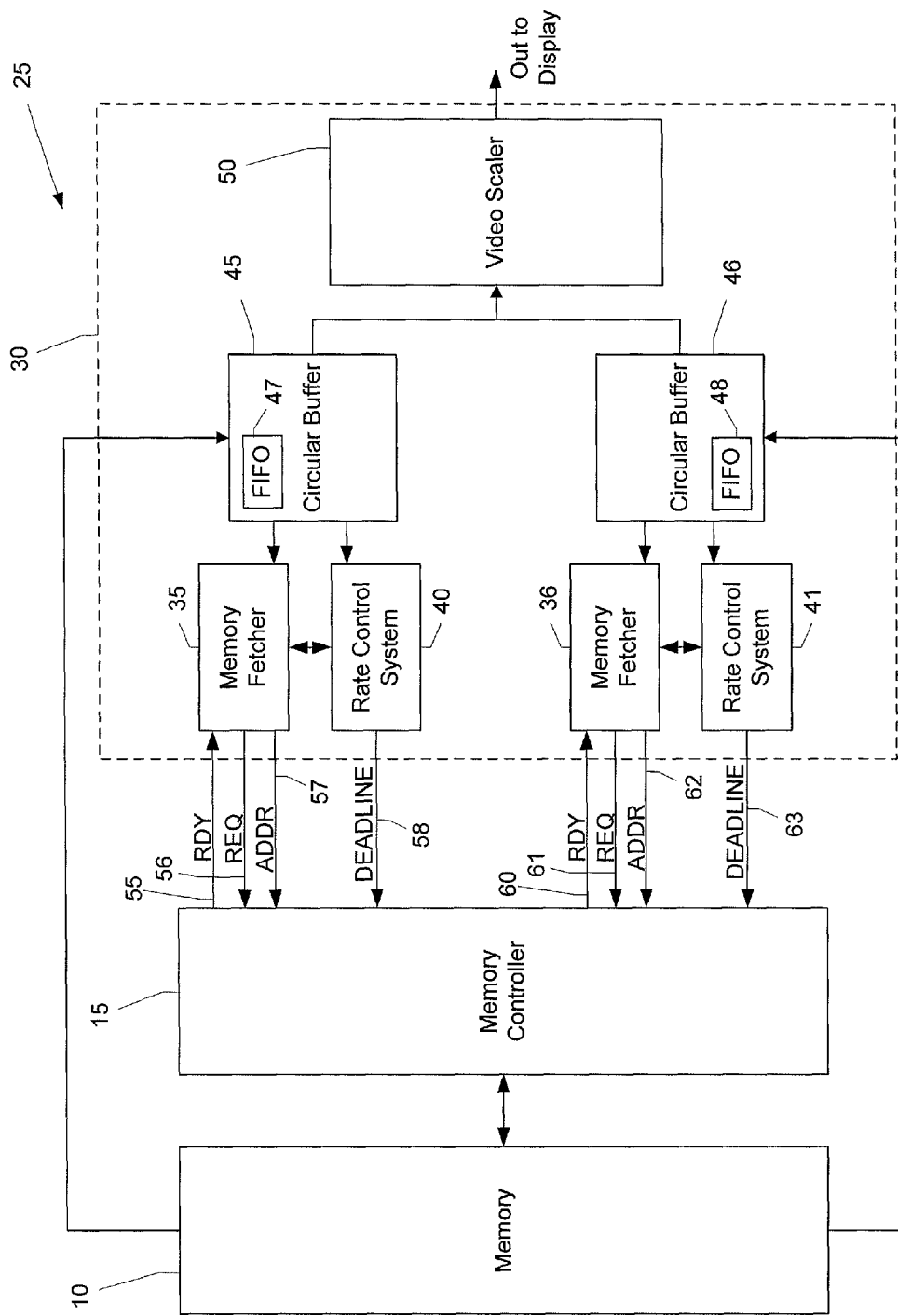
FIG. 2 is a block diagram of a signal video scaling system including a video scaler.
Figure 3:
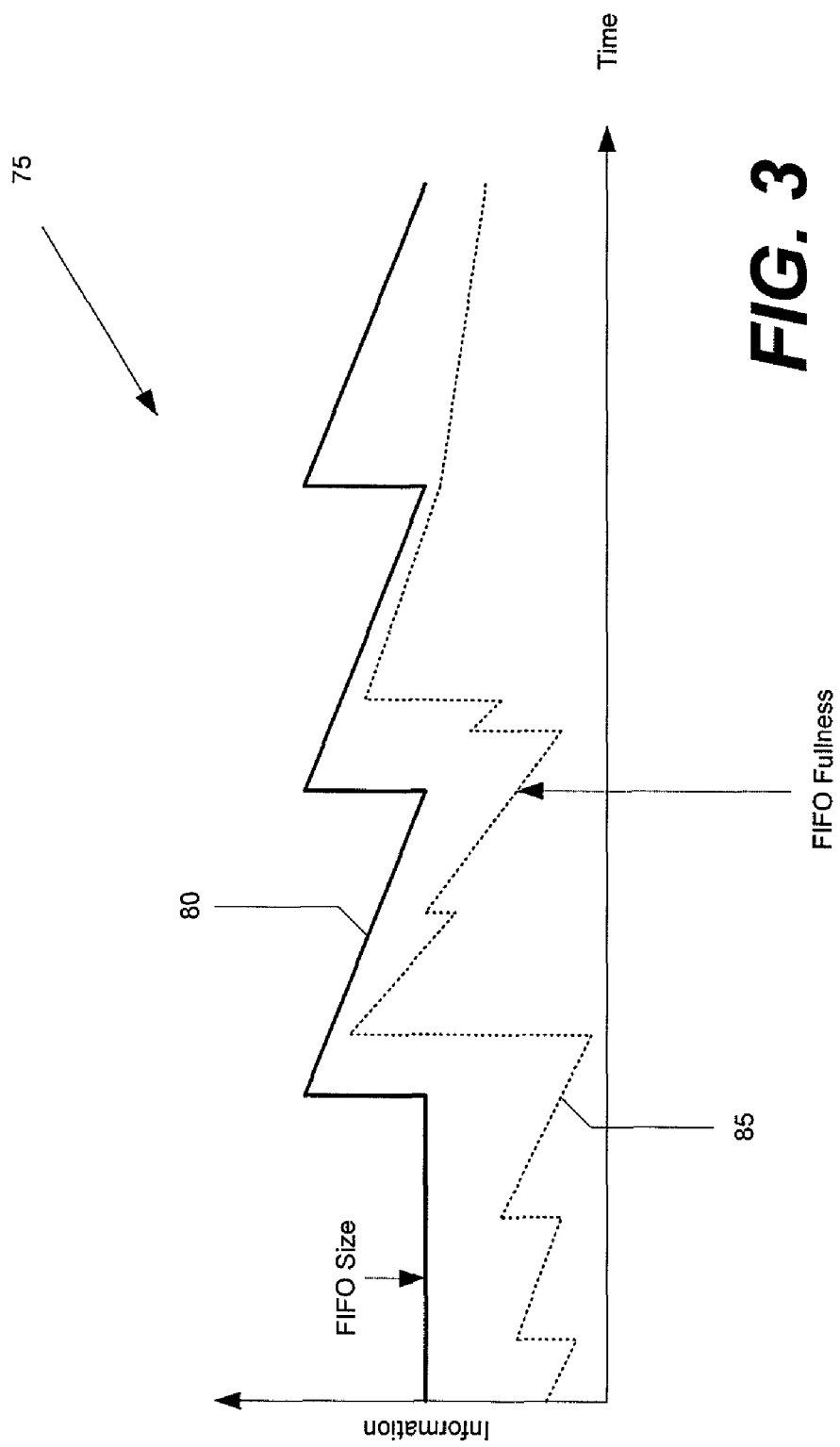
FIG. 3 is a graph indicating characteristics of a variable size first-in-first-out memory used in the system shown in FIG. 2.

Referring to FIG. 2, a video processing system 25 includes the memory 10, the memory controller 15, and a client 30. While a single one of the memory 10, the memory controller 15, and the client 30 are shown, other quantities are possible. The client 30 includes memory fetchers 35 and 36, rate control systems 40 and 41, circular buffers 45 and 46, and a video scaler 50. The memory fetcher 35 is coupled to the memory controller 15 via connections 55, 56, and 57. The memory fetcher 36 is coupled to the memory controller 15 via connections 60, 61, and 62. The rate control system 40 is coupled to the memory controller 15 via a connection 58. The rate control system 41 is coupled to the memory controller 15 via a connection 63. The buffer 45 is coupled to the memory fetcher 35, the rate control system 40, and to the video scaler 50. The buffer 46 is coupled to the memory fetcher 36, the rate control system 41, and to the video scaler 50. The video scaler 50 is configured to be coupled to a display and/or other signal processing equipment. The buffers 45 and 46 include variable size FIFOs 47 and 48, respectively, which are configured to assist in absorbing memory latency. The FIFOs 47 and 48 are configured such that during each clock cycle of the system 25, the size of the FIFOs 47 and 48 (e.g., an amount of available space for information to be stored) can vary. Referring to FIG. 3, a graph 75 includes a FIFO size indicator 80 and a FIFO fullness indicator 85. The FIFO size indicator 80 indicates the amount of space available in, e.g., FIFO 47, while FIFO fullness indicator 85 indicates the amount of information stored in, e.g., the FIFO 47 (e.g., the amount of information waiting in the FIFO 47 to be consumed by the buffer 45). While the memory fetchers 35 and 36 and the rate control systems 40 and 41 are shown as separate components, other configurations are possible (e.g., a single component can include the functionality provided by the memory fetchers 35 and 36 and/or the rate control systems 40 and 41).

Figure 4:
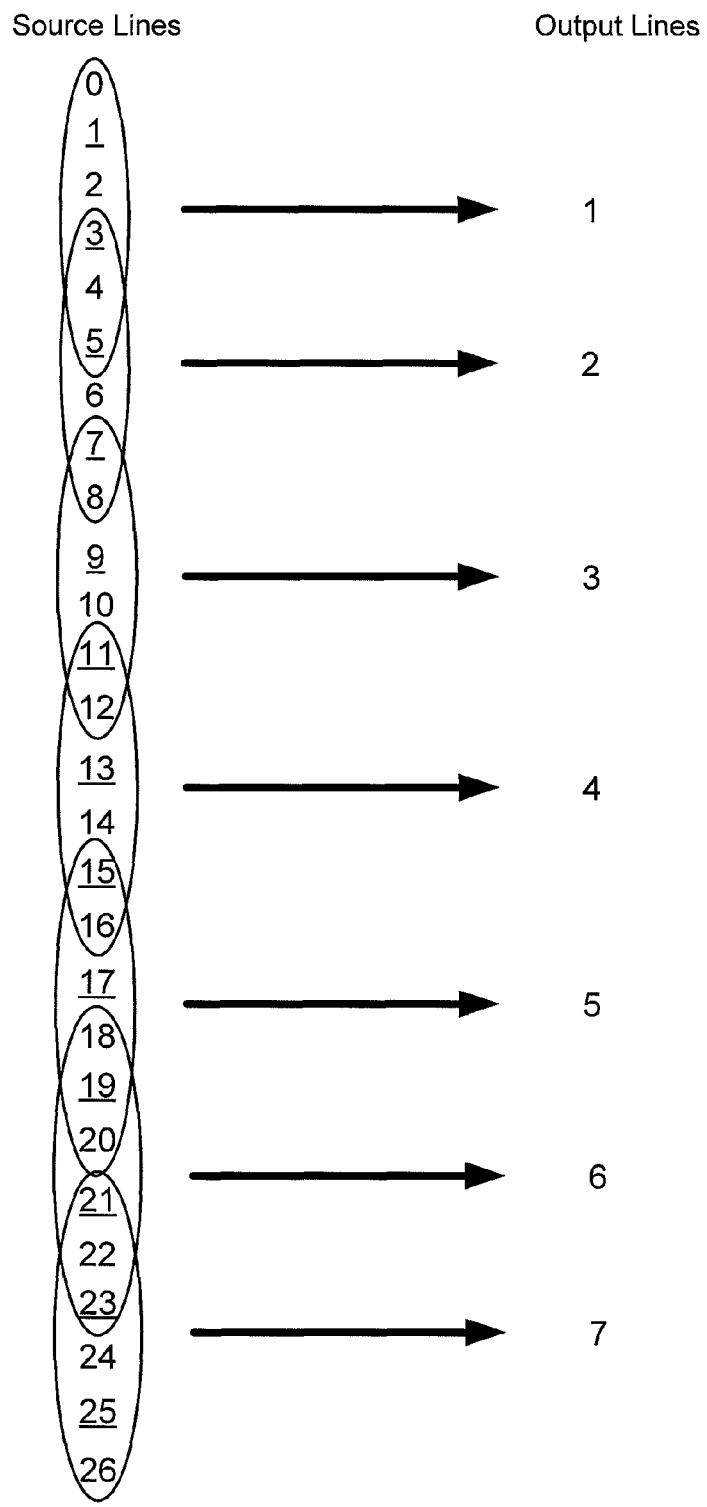
FIG. 4 is a diagram illustrating a process of generating video output lines using video input lines using the system shown in FIG. 2.

The scaler 50 is configured to use source information provided by the buffers 45 and 46 to perform scaling operations and to output an output line. Referring also to FIG. 4, video scaler 50 is a 6-tap vertical filter configured to use (when downscaling at a 3.75 vertical downscaling ratio, as shown in FIG. 4) six horizontal lines of information to generate a single horizontal output line. The scaler 50 is configured to receive three of the six horizontal lines from the buffer 45, and the remaining three horizontal lines from the buffer 46. For example, three of the six lines of information can correspond to source information (e.g., information provided by a source), which is stored in one portion of the memory, and the other three lines can correspond to generated information (e.g., information generated by a deinterlacer using the source information), which is stored in another portion of the memory. The scaler 50 is configured to weave the two sets of information together to generate a complete video frame. To produce an output line $1_o$, the scaler 50 is configured to use input lines $0_i$-$5_i$; to produce an output line $2_o$, input lines $3_i$-$8_i$ are used; to produce an output line $3_o$, input lines $7_i$-$12_i$ are used; etc. For each sextet of lines consumed by the scaler 50, the input lines are provided by the buffer 45 are indicated by non-underlined source lines in FIG. 4, and the input lines provided by the buffer 46 (are indicated by the underlined source lines in FIG. 4. As each output line is generated, the buffers 45 and 46 are configured to provide additional input lines of information to the scaler 50. For example, after the scaler 50 generates the output line $1_o$, the buffer 45 provides source lines $6_i$ and $8_i$ to the scaler 50, and the buffer 46 provides source line $7_i$ to the buffer 45. While the following discussion focuses on the memory fetcher 35, the rate control system 40, and the buffer 45, the configurations of the memory fetcher 36, the rate control system 41, and the buffer 46 are similar.

Figure 5:
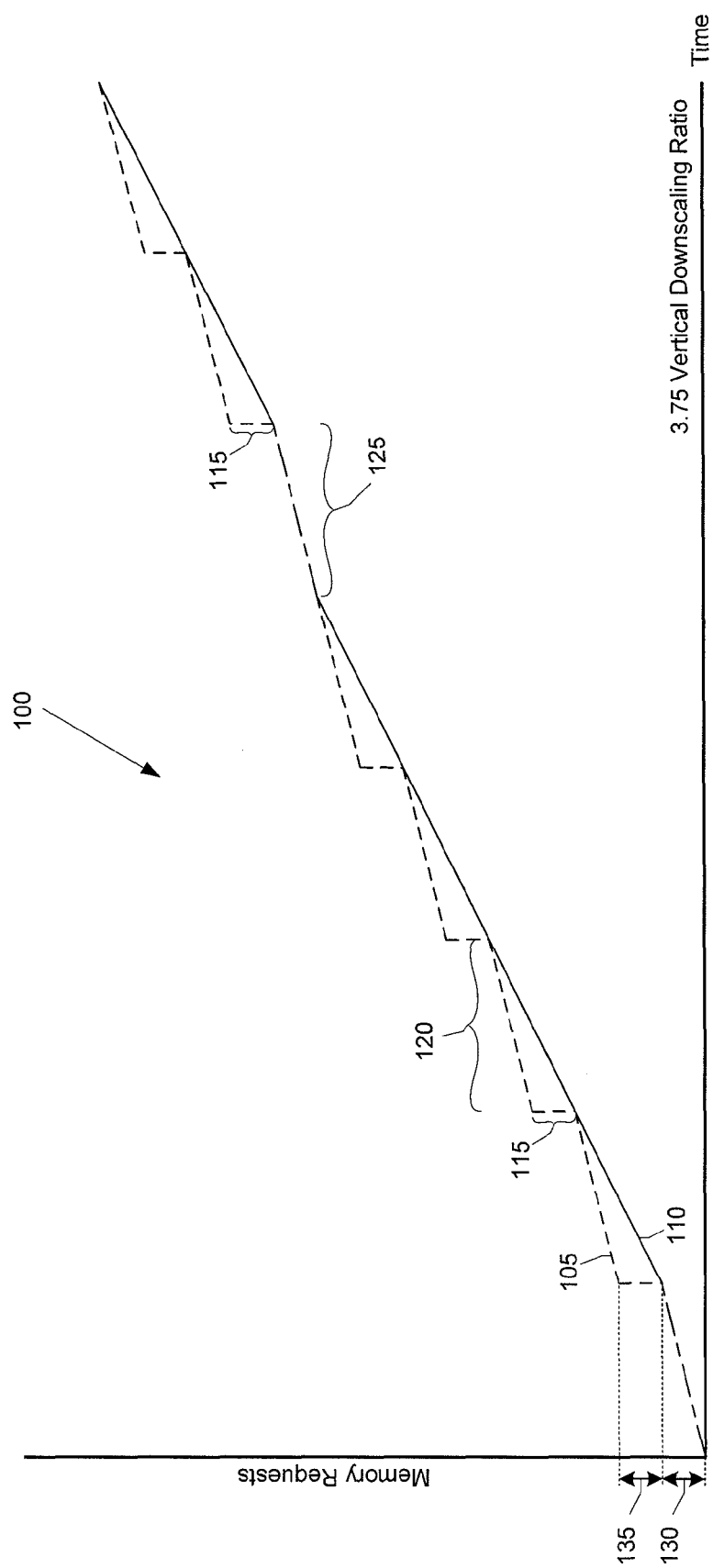
FIG. 5 is a graph indicating memory consumption rates of the system shown in FIG. 2.

Referring also to FIG. 5, a graph 100 represents the rate at which the scaler 50 consumes information provided by the memory controller 15, via the buffer 45, and includes an actual read pointer (ARP) 105 and a virtual read pointer (VRP) 110. The graph 100 represents operational characteristics of the buffer 45 and the scaler 50 when operating at a 3.75 downscaling ratio (e.g., fifteen source lines are consumed for every four output lines). The scaler 50, however, can operate at other downscaling ratios (e.g., 2). Thus, the graph 100 varies as the downscaling ratio varies.

Figure 6A:
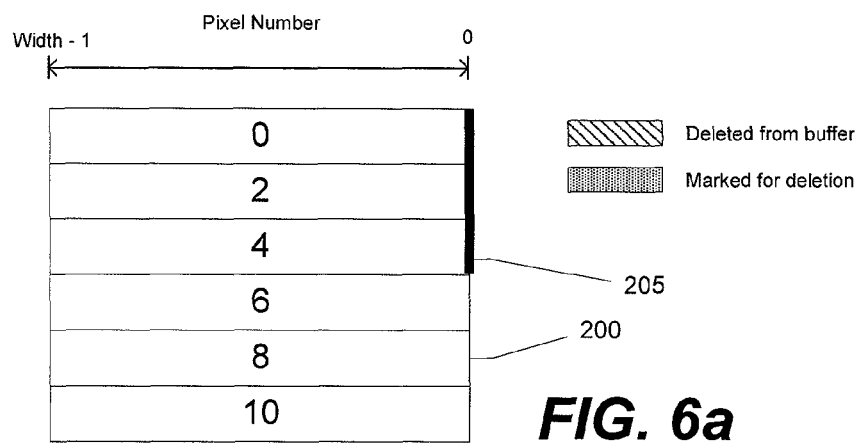
FIGS. 6a-6d are time sequence drawings indicating memory consumption by the system shown in FIG. 2.
Figure 6B:
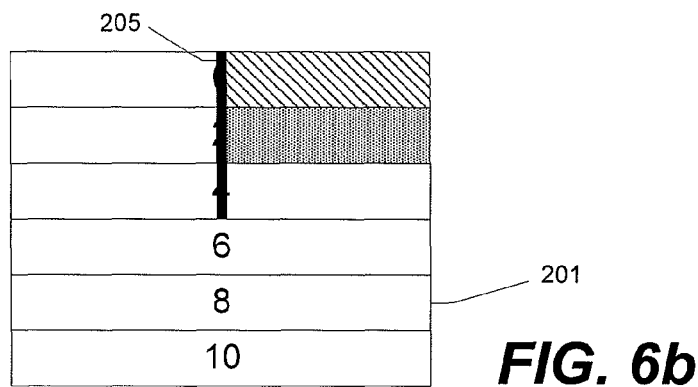
Figure 6C:
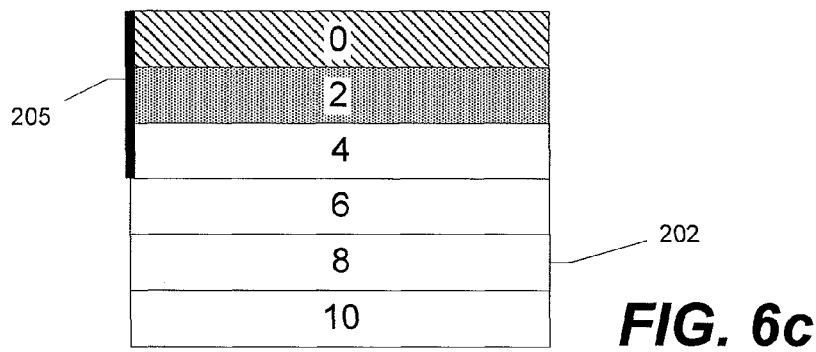
Figure 6D:
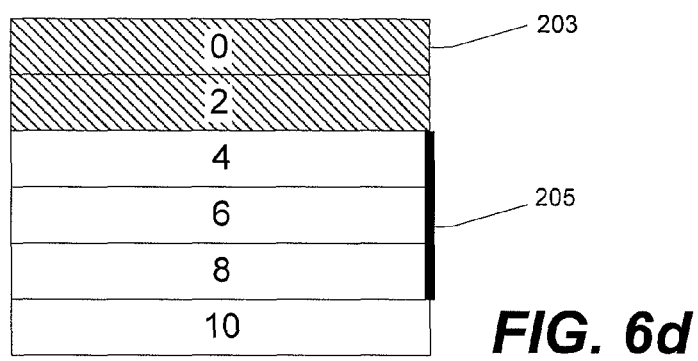

The ARP 105 indicates the rate at which information is deleted from the buffer 45 (e.g., as the information is no longer used by the scaler 50). For example, referring also to FIGS. 6a-6d, time sequence drawings 200-203 represent time samples of the process of generating the output line 1. The time sequence drawings 200-203 represent the portion of the information used by the scaler 50 that is provided by the buffer 45. The time sequence drawings 200-203 include input lines $0_i$, $2_i$, $4_i$, $6_i$, $8_i$, and $10_i$, and a marker 205 that represents the portion of each of the source lines used at any given time by the scaler 50 to generate the output line $1_o$. The scaler 50 is configured to perform scaling operations on a per-pixel basis, thus the marker 205 progresses from the right to the left of the time sequence drawings 200-202 as output line $1_o$ is produced. As the marker 205 progresses from right to left, however, the consumed portions of source line $0_i$ are deleted from the buffer 45 (e.g., corresponding to intervals 120 and 130 in FIG. 5). As the marker 205 progress from right to left, the portions of the source line $2_i$ used by the scaler 50 are marked for deletion, but not deleted from the buffer 45 (e.g., with each of the circular buffers 45 and 46 using a single write pointer). Once the scaler 50 produces output line $1_o$ and begins to produce output line $2_o$ (e.g., FIG. 6d), the source line 2 is deleted from the buffer 45 (e.g., corresponding to an interval 135 in FIG. 5). To produce output line $2_o$ after outputting output line $1_o$, the scaler 50 is configured to desire two additional lines of information from the buffer 45 (e.g., source lines 6 and 8) and one additional line of information from the buffer 46 (e.g., a source line 7). At a scaling ratio of 3.75, however, then one additional source line from the buffer 45 may be used by the scaler 50 after outputting an output line.

For example, referring again to FIG. 4, after outputting output line $5_o$, only one additional line (from the buffer 45) is used to create output line $6_o$.

The VRP 110 indicates the minimum average rate at which memory requests from the memory fetcher 35 should be served by the memory controller 15 in order for the buffer 45 to contain sufficient information to avoid image corruption by the scaler 50. The rate control system 40 is configured to calculate the VRP 110 as a function of the amount of information stored in the buffer 45 and the rate at which the scaler 50 consumes information stored in the buffer 45. The rate control system 40 is configured to calculate the VRP 110, in bytes per memory clock, according to:

$$\frac{(\text{Total\_\#\_of\_Bytes\_in\_Each\_Horizontal\_Source\_Line})(\alpha)}{(\text{Total\_Line\_Time})} = \text{VRP\_110}, \quad (1)$$

where the Total_Line_Time includes horizontal active and horizontal blanking time and $\alpha$ is a predetermined constant. The rate control system 40 is configured to multiply the Total_#_of_Bytes_n_Each_Horizontal_Source_Line by $\alpha$ to ensure that the VRP 110 will catch up to the ARP 105 prior to the next time the ARP 105 jumps vertically (e.g., an interval 115). By adjusting $\alpha$, a user of the system 25 can adjust how quickly the VRP 110 catches up with the ARP 105 (e.g., the slope of the VRP 110 increases as $\alpha$ increases). The constant $\alpha$ can be set during manufacture of the system 25 and/or can be user settable. The constant $\alpha$ can be set, e.g., according to

TABLE 1

| Vertical scaling ratio | $\alpha$ |
| --- | --- |
| >3 | 2 |
| >2.66 | 1.5 |
| >2.5 | 1.334 |
| >2.4 | 1.25 |
| >2.0 | 1.2 |
| >1 | N/A |
| other | N/A |

A more granular table, and/or different values for $\alpha$ are possible. The VRP 110, however, is preferably constrained by the ARP 105 (e.g., the VRP 110 should not vertically exceed the ARP 105), to inhibit the memory fetcher 35 from requesting information from the memory controller at a higher average rate than of information consumption by the scaler 50. The values shown for $\alpha$ in table 1, however, are preferred minimum values used to support the available downscaling ratios. For example, when a downscaling ratio of 3.75 is used, $\alpha$ can be greater than 2. Furthermore, while the values of $\alpha$ corresponding to the downscaling ratios of ">1" and "other" are shown as N/A, $\alpha$ can be, for example, 1.

The constant $\alpha$ is indicative of the ratio of input lines used by the scaler 50 to generate a single output line. For example, $\alpha$ indicates that the scaler 50 is requesting "$\alpha$" lines in the amount of time it takes to generate a single output line. Thus, using the example of a 3.75 vertical downscaling ratio where $\alpha=2$, $\alpha$ indicates that the scaler 50 is trying to fetch two lines of input information for every line outputted. For example, referring also to FIG. 5, $\alpha$ can be used to show that the VRP 110 will advance fast enough in the interval 120 to catch up to the ARP 105 when it jumps during an interval 115.

The memory fetcher 35 is configured to act as an interface between the memory controller 15 and the buffer 45. The memory fetcher 35 is configured to issue memory requests to the memory controller 15 for additional video information when the buffer 45 has sufficient free space (e.g., by tracking the free space in the FIFO 47). The memory fetcher 35 is configured to provide a request (REQ) signal, an address (ADDR) signal, and a deadline signal to the memory controller 15 via the connections 56, 57, and 58 respectively. The REQ signal is a signal indicating that the memory fetcher is requesting information from the memory 10. The ADDR signal includes information corresponding to the location of the desired information in the memory 10. The deadline signal includes a deadline by which the video scaler 50 desires the requested information. The rate control system 41 is configured to continuously recalculate during the pendency of the memory request to the memory controller 15. The memory fetcher 35 is configured to provide the REQ, ADDR, and deadline signals to the memory controller 15 until the memory controller 15 provides an acknowledgement to the memory fetcher 35 in the form of a ready (RDY) signal, via the connection 55. The memory controller 15 is configured to use the value of the deadline signal (e.g., because the deadline value varies during the pendency of the memory request) present on the connection 58 at the time the RDY signal is provided to the memory fetcher 35. The memory fetcher 35 is configured to accept the RDY signal from the memory controller 15 as an acknowledgement that the memory request has been accepted.

Referring also to FIG. 7, the rate control system 40 is configured to calculate an estimated time to starvation pointer (ETOSP) 150, which is used to calculate the deadline sent with memory requests to the memory controller 15. The ETOSP 150 represents the minimum amount of information the scaler 50 desires to produce a complete, uncorrupted image. The rate control system 40 is configured to calculate the ETOSP 150 by shifting the VRP 110 upwards (e.g., by three lines worth of information) to account for the amount of information that the video scaler 50 uses from the buffer 45 to generate a single output line (along with three lines of additional information from the buffer 46, as described above). While the rate control system 40 has been described as shifting the VRP 110 by three lines, other configurations are possible, for example, if the scaler 50 is an 8-tap scaler, the VRP 110 can be shifted by four lines to calculate the ETOSP 150. In effect, the VRP 110, and the ETOSP 150 form upper and lower bounds, respectively, of values of buffer read pointers at any given time. The amount of information provided by the memory controller 15 to the buffer 45 is represented by line 155.

The rate control system 40 is configured to calculate a deadline corresponding to a memory request sent to the memory controller 15 by analyzing the relationship of the line 155 and the ETOSP 150. For example, the distance between the line 155 and the ETOSP 150 (e.g., a distance 160) is representative of the amount of information stored in the FIFO 47 of the buffer 45, e.g. as the line 155 increases in distance above the ETOSP 150, the amount of information stored in the FIFO 47 increases. If a point (in time) of the line 155 is identical to a point (in time) of the ETOSP 150, then the FIFO 47 is empty, and the buffer 45 has exactly the amount of information desired by the video scaler 50. The rate control system 40 is configured determine the deadline based upon the distance 160. As the distance 160 grows larger, the rate control system 40 is configured to set the deadline of a related memory request further in the future. For example, for any given memory request sent by the memory fetcher 35 to the memory controller 15, the rate control system 40 is configured to calculate the deadline to be submitted with the memory request according to:

$$\frac{Bytes\_of\_Information\_in\_FIFO}{Bytes\_Consumed\_by\_Scaler\_per\_Clock\_Cycle} = Slack, \quad (2)$$

where Slack is defined in terms of memory clock cycles. Thus, when a memory request is submitted, the rate control system 40 is configured to determine a current system time, and add at least a number of clock cycles equal to Slack to calculate the deadline.

The memory controller 15 is configured to use the deadline provided by the rate control system 40 to determine the urgency of and most efficient manner of fulfilling memory requests from multiple clients (e.g., the clients 20). The memory controller 15 is configured to build up "credit" by fulfilling outstanding memory requests prior to the deadline. For example, assume that at time X (where X represents a specific clock cycle) the memory controller has fifty outstanding memory requests from the memory fetcher 35, where the furthest in time deadline is X+1000. If the memory controller fulfills all of the outstanding requests by X+100, then the memory controller has built up a credit with the memory fetcher 35 wherein the buffer 45 does not desire any additional information from the memory 10 until time X+1000. Thus, the memory controller 15 can choose not to provide any additional information from the memory 10 to the buffer 45 until time X+1000.

The size of the variable size FIFOs 47 and 48 can be calculated by comparing a write pointer 165 against the ETOSP 150. The write pointer 165 is indicative of the amount of information that can be stored in the FIFOs 47 or 48 at any given time. For example, the write pointer 165 is the last address that can be written to before the circular buffer 45 or 46 becomes full. Thus, the distance (e.g., a distance 170) between the line 150 and the write pointer 165 is representative of the size of the FIFO 47 or the FIFO 48 at any given time.

Figure 8A:
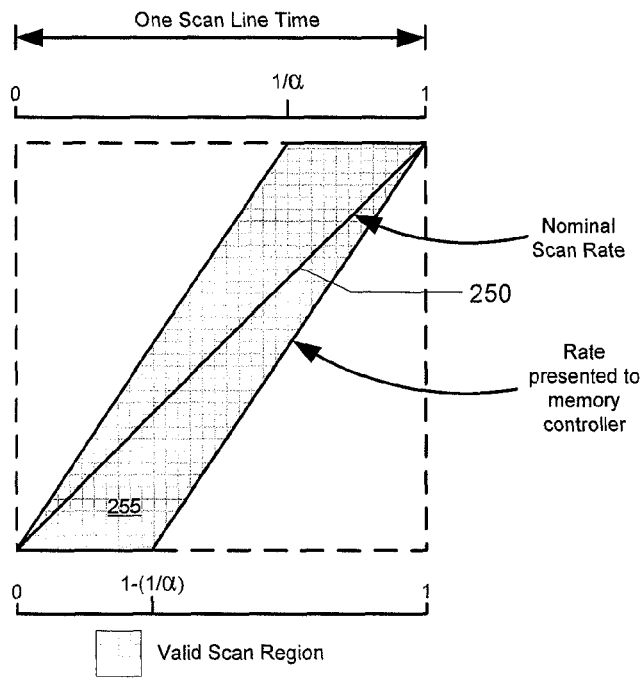
FIGS. 8a-8b are diagrams illustrating scan rates of the system shown in FIG. 2.
Figure 8B:
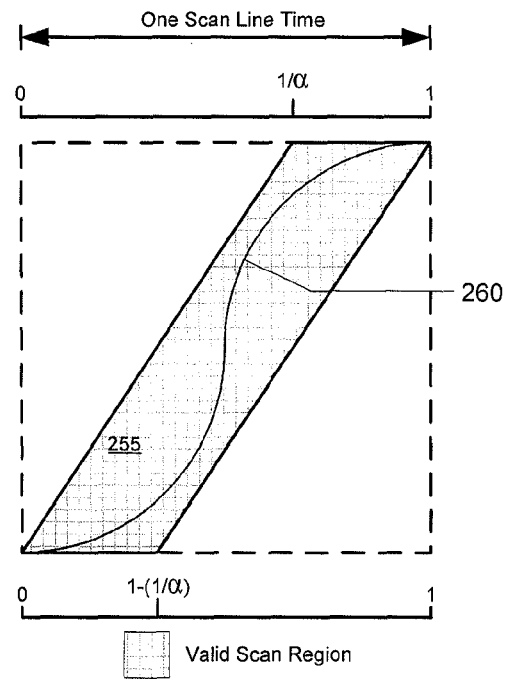

The system 25 is configured to support various scan line rates (e.g., memory request rates). For example, referring to FIG. 5, while the ARP 105 is substantially linear during the interval 120, other shapes are possible. Referring also to FIG. 8a, the portion of the ARP 105 shown in the interval 120 is represented as a scan rate 250. While the scan rate 250 is substantially linear, other shapes are possible within the confines of a valid scan region 255. For example, certain signal processing algorithms, e.g., anamorphic scaling and/or pillar boxing, can cause a non-linear scan rate 250 within the interval 120. For example, referring also to FIG. 8b, a scan line 260 reflects the scan rate (within the interval 120) generated during an anamorphic scaling operation. Furthermore, the system 25 can be configured to include a larger valid scan region (and therefore supporting larger variation of the scan rate 250) by increasing the value of $\alpha$ used in Equation (1).

Figure 9:
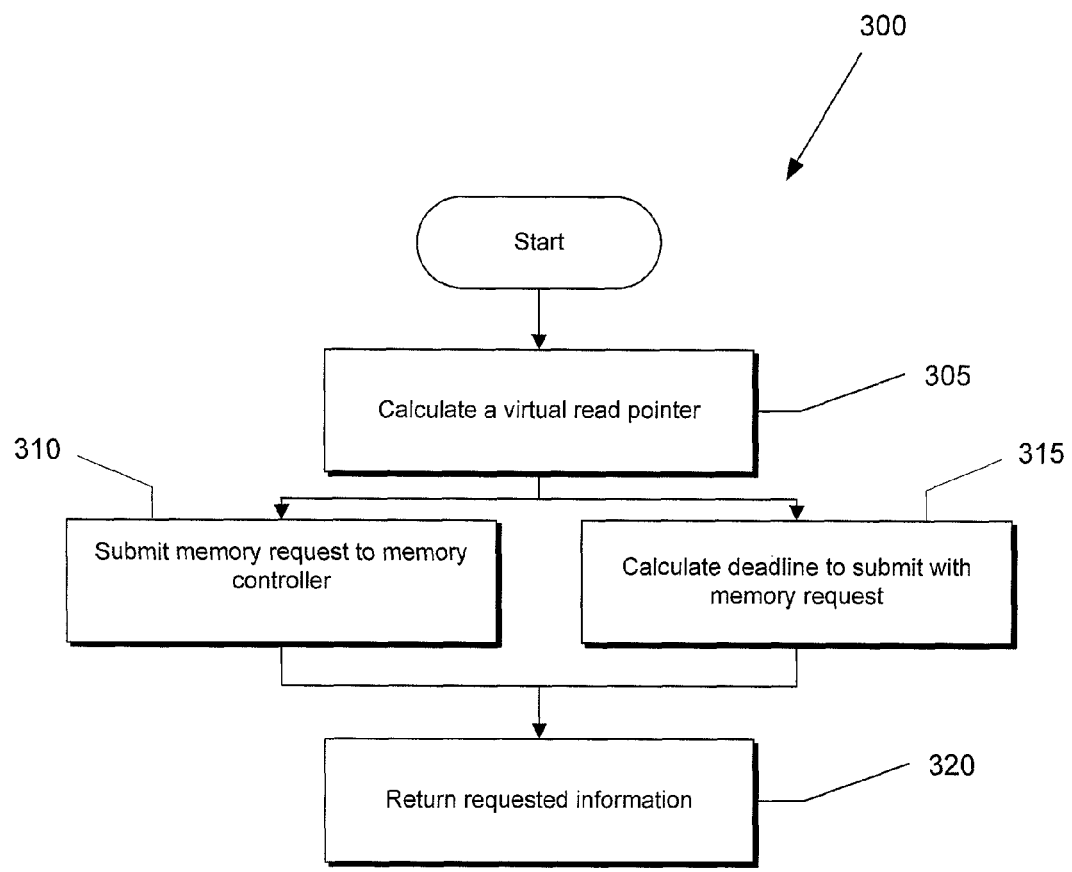
FIG. 9 is a flowchart of a process of submitting and fulfilling memory requests in the system shown in FIG. 2.

In operation, referring to FIG. 9, with further reference to FIGS. 3-8, a process 300 for submitting and fulfilling a memory request using the system 25 includes the stages shown. The process 300, however, is exemplary only and not limiting. The process 300 may be altered, e.g., by having stages added, removed, or rearranged. The process 300 can be repeated each time the client 20 desires information from the memory 10. While the process 300 focuses on the operation of the memory fetcher 35, the rate control system 40, and the buffer 45, the operation of the memory fetcher 36, the rate control system 41, and the buffer 46 is similar.

At stage 305, the rate control system 40 calculates the VRP 110 corresponding to the buffer 45. The rate control system calculates the VRP 110 according to Equation (1). The rate control system shifts the VRP 110 upwards by three lines worth of information (e.g., because the scaler 50 consumes three lines from the buffer 45 and three lines from the buffer 46) to calculate the ETOSP 150.

At stage 310, the memory fetcher 35 submits a memory request to the memory controller 15. The memory request includes the REQ signal, indicating that the memory fetcher 35 is asking for information from the memory 10, the ADDR signal, indicating the address corresponding to the desired information, and the deadline signal, indicating the time by which the scaler 50 desires the requested information. Once the memory controller 15 is ready to accept the memory request from the memory fetcher 35, the memory controller 15 provides the RDY signal to the memory fetcher 35. The memory fetcher 35 is configured to provide the REQ, ADDR, and deadline signals to the memory controller 15 until the RDY signal is received from the memory controller 15.

At stage 315, the rate control system 40 repeatedly calculates a deadline that is submitted to the memory controller 15 while each respective memory request is pending i.e., not acknowledged) with the memory controller 15. For example, as time passes during the pendency of a memory request to the memory controller 15, the request becomes more urgent, thus a more urgent deadline is desired (in relative terms). The rate control system 40 calculates the amount of Slack, defined in terms of memory clock cycles, which the memory controller 15 has to fulfill a specific memory request. The rate control system 40 calculates the amount of Slack using Equation (2). The deadline is calculated by adding the Slack to the current clock time.

At stage 320, the memory controller 15 returns the requested information. As the deadline provided by rate control system 40 can vary, the memory controller 15 uses the deadline provided by the rate control system 40 at the time the acknowledgment is provided by the memory controller 15 to the rate control system 40. The memory controller 15 prioritizes the memory requests received from the various clients 20 coupled to the memory controller 15. For example, the memory controller 15 can prioritize the memory requests according to the deadline included in the memory request, or build up credit with a specific one of the clients 20 by fulfilling all outstanding memory requests immediately. The memory controller 15 causes the memory 10 to provide the requested information to the buffer 45.

Other embodiments are within the scope and spirit of the invention. As one example, the invention can be used in applications where client data demands change over time. As another example, while the invention has been discussed in the context of downscaling, the invention can be used with other types of signal processing. For example, the scaler 50 can be configured to upscale a video image. The scaler 50 can be replaced with processors capable of performing anamorphic scaling, pillarboxing, letterboxing, interlacing, deinterlacing, etc. Furthermore, while the invention has been discussed in the context of video information, other types of information can be processed using the invention.

Still other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A system for processing video information, the system comprising:
   a memory configured to store video information;
   a memory controller coupled to the memory and configured to receive memory requests for the video information;
   a first video signal processing client coupled to the memory controller and comprising:
      a video signal processor;
      a buffer coupled to the video signal processor; and
      a memory request module coupled to the memory controller and to the buffer, the memory request module being configured to submit amortized memory requests to the memory controller and to calculate a first deadline indicative of a time by which the first video signal processing client desires information requested in each respective one of the amortized memory requests.

2. The system of claim 1 wherein the memory request module is configured to calculate the first deadline as a function of the amount of information stored in the buffer and a rate at which the video signal processor consumes the information stored in the buffer.

3. The system of claim 1 wherein the memory controller is configured to fulfill a selected one of the amortized memory requests as a function of the first deadline included with the selected memory request.

4. The system of claim 3 wherein the system includes a second video signal processing client configured to submit memory requests to the memory controller, each respective memory request submitted by the second client including a second deadline indicative of a time by which the second client desires information requested in the respective memory request.

5. The system of claim 4 wherein the memory controller is configured to fulfill memory requests from the first video signal processing client and the second client as a function of the first and second deadlines included in the respective memory requests.

6. The system of claim 1 wherein the buffer further includes a first-in-first-out (FIFO) buffer.

7. The system of claim 6 wherein the memory request module is configured to calculate the first deadline based on an amount of video information stored in the FIFO.

8. The system of claim 1 wherein the memory controller is configured to build up credit with the video signal processing client by fulfilling outstanding memory requests from the first video signal processing client prior to the respective first deadline included in each of the respective memory requests.

9. The system of claim 1 wherein the memory request module is configured to:
   calculate an average rate at which the video signal processor desires video information from the memory; and
   scale the average rate by a scaling factor to generate a virtual read pointer.

10. The system of claim 9 wherein the scaling factor is substantially equal to a quantity of input lines used by the video signal processor to generate an output line.

11. The system of claim 1 wherein the video signal processor is a scaler.

12. The system of claim 11 wherein the amortized memory requests are submitted to the memory controller at a rate based on a scaling ratio at which the scaler is operating.

13. A method of managing memory requests from a video signal processing client to a memory and a memory controller, the method comprising:

calculating an average rate at which the video signal processing client desires video information from the memory;

scaling the average rate by a scaling factor to generate a virtual read pointer; and submitting the memory requests from the video signal processing client to the memory controller at an amortized rate based on the virtual read pointer.

14. The method of claim 13 further comprising:

generating a deadline, for each respective memory request, indicative of a time by which the video signal processing client desires information requested in the respective memory request; and including the generated deadline in each submitted memory request.

15. The method of claim 14 wherein the deadline is based upon the amount of video information stored in the video signal processing client and the rate at which the video signal processing client consumes the video information.

16. The method of claim 14 further comprising fulfilling the submitted memory requests based upon the deadline included in each respective memory request.

17. The method of claim 16 further comprising building up credit with the video signal processing client by fulfilling selected memory requests prior to the deadlines included in the selected memory requests.

18. The method of claim 13 further comprising calculating an estimated time of starvation based upon the virtual read pointer.

19. The method of claim 18 wherein submitting the memory requests includes submitting the memory requests at a rate based on the estimated time of starvation.

20. The method of claim 13 further comprising receiving memory requests at the memory controller from another client, wherein each of the memory requests from the another client includes another deadline indicative of a respective time by which the another client desires information requested in each of the memory requests.

21. The method of claim 20 wherein fulfilling the memory requests includes fulfilling the memory requests from the video signal processing client and the another client based upon the respective another deadline included in each respective memory request.

* * * * *